United States Patent [19]

Springer

[11] Patent Number: 4,503,440

[45] Date of Patent: Mar. 5, 1985

[54] THIN-FILM MAGNETIC WRITING HEAD WITH ANTI-SATURATION BACK-GAP LAYER

[76] Inventor: Gilbert D. Springer, 48571 Milmont Dr., Fremont, Calif. 94538

[21] Appl. No.: 473,361

[22] Filed: Mar. 8, 1983

[51] Int. Cl.[3] .......... G01D 15/12

[52] U.S. Cl. .......... 346/74.5

[58] Field of Search .......... 346/74.5; 360/125–126

[56] References Cited

U.S. PATENT DOCUMENTS 4,414,554 7/1980 Springer .......... 346/74.5

*Primary Examiner*—Thomas H. Tarcza

*Attorney, Agent, or Firm*—Kolisch, Hartwell, Dickinson & Anderson

[57] ABSTRACT

Apparatus for producing a magnetic image in a magnetic image storage medium. The apparatus includes a thin-film magnetic web with a pole-defining face and a second thin-film blanket magnetically spaced from the first magnetic web and having a second surface defining a second pole face. Spaced from the pole faces is a diamagnetic spacer which forms a special back gap in the magnetic circuit. An electrical coil sandwiched between the two magnetic materials induces flux in them. The spacer may extend normal to the flux path beyond the effective flux paths otherwise existing in the web and blanket.

6 Claims, 3 Drawing Figures

THIN-FILM MAGNETIC WRITING HEAD WITH ANTI-SATURATION BACK-GAP LAYER

BACKGROUND AND SUMMARY OF THE INVENTION

This application pertains to a thin-film magnetic writing head, and in particular, to such a writing head having a diamagnetic back gap spacer.

Magnetic flux flowing in the magnetic circuit of an energized thin-film writing head travels through very thin materials. Due to the nature of thin-film head production, the uniform thickness of all parts of various layers in construction is sometimes difficult to achieve. In such cases, writing heads combined to form a printer may have different operating characteristics.

The description which follows is directed to magnetic writing heads of the types disclosed in my U.S. patent application Ser. No. 170,788 entitled "Magnetic Imaging Method and Apparatus" now U.S. Pat. Nos. 4,414,554 and 381,922 entitled "Differential-Permeability Field-Concentrating Magnetic Read/Write Head" (filed May 26, 1982), respectively. Although reference is made to certain specific heads, it will be understood that the invention may be applied equally well to other types of thin-film magnetic writing heads. Writing heads similar to the one described in my prior applications may be excited sufficiently with a current varying from 100 milliamperes to 300 milliamperes. Portions of an inefficient writing head may have a constriction which saturates magnetically before enough flux flows through the writing gap of the head to form a desired magnetic image in a magnetic-image storage medium.

It is therefore a general object of this invention to provide a magnetic head which overcomes the above-noted disadvantage.

More specifically, it is a desired objective to provide such a writing head which may be driven hard enough to provide sufficient flux in even the least efficient heads without saturating any of the heads.

Thin-film magnetic heads constructed according to my prior applications are characterized by sheet-like layers which are placed relative to each other in order to form a magnetic circuit. Typically, one magnetic layer forms a base on which additional layers are applied. The base layer is magnetically spaced from an overlayer of magnetic material with a surface of each of these two layers forming the writing gap. At a position spaced from this gap, the two magnetic materials are in contact in order to complete the magnetic circuit. Electric current-carrying coils are disposed relative to these two magnetic materials in order to induce the flow of flux in them.

Applicant, by this invention, applies a layer of diamagnetic material in the back gap region in order to increase the reluctance of the magnetic path through this portion. This tends to equalize the reluctance through this new back gap with that of the leak or shunt flux which travels between the two magnetic layers intermediate the front and back gaps. Such construction reduces the amount of flux actually traveling through the back gap as compared to such a head not having the back gap. It can therefore be driven harder in order to achieve the desired flux level without saturating that portion of the head associated with the back-gap flux path.

These and additional objects and advantages of the present invention will be more clearly understood from a consideration of the drawings and the detailed description of the preferred embodiment.

DETAILED DESCRIPTION OF THE INVENTION

Figure 1:
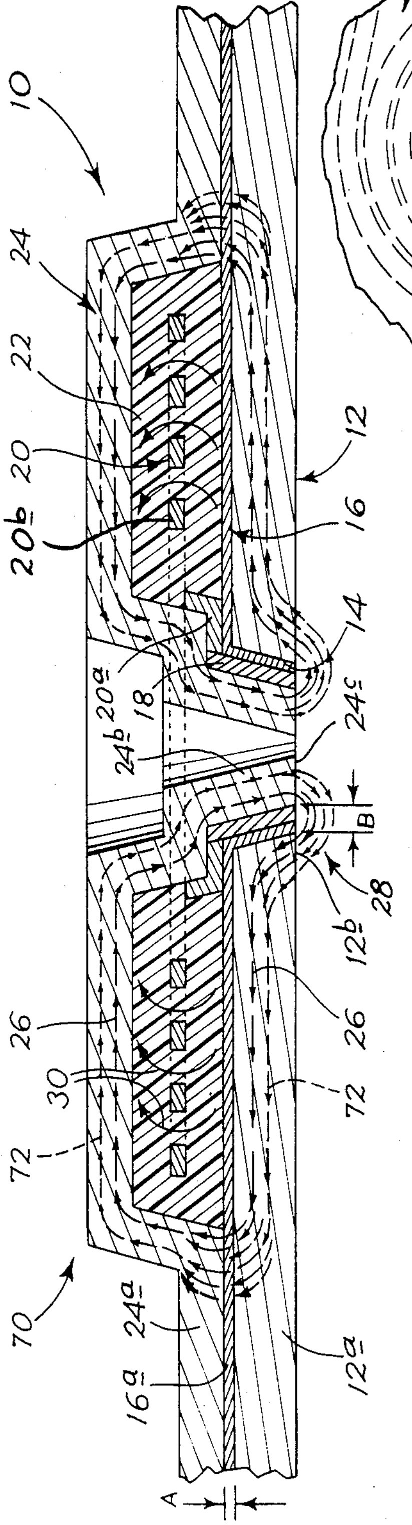
FIG. 1 is a cross-sectional view of a magnetic writing head made in conformance with the present invention.
Figure 2:
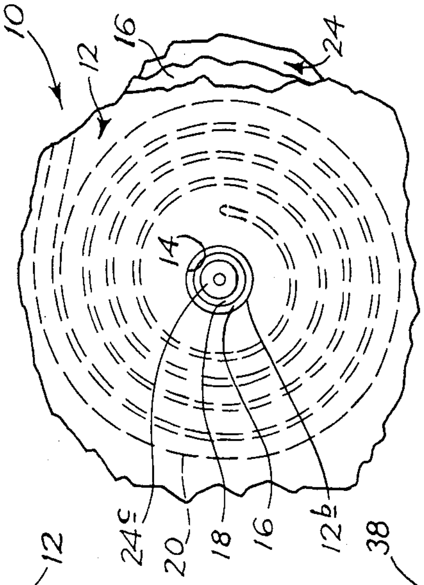
FIG. 2 is a reduced fragmentary bottom view of the head of FIG. 1.
Figure 3:
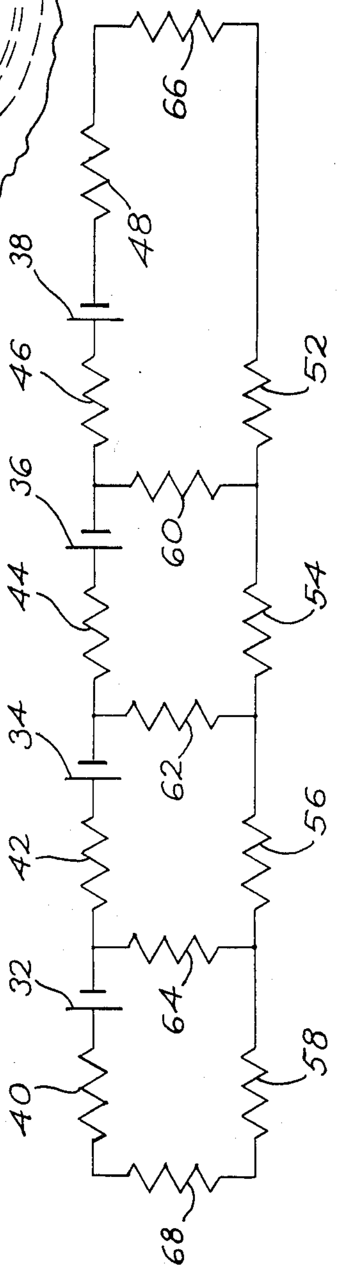
FIG. 3 is a schematic diagram of an electrical circuit analogous to the magnetic circuit of the head of FIG. 1.

Directing attention initially to FIGS. 1 and 2, indicated generally at 10 is a magnetic writing head made similar to certain of the writing heads previously described in my above-identified U.S. patent applications. Each head has what might be thought of as a pancake-sandwich construction and, when viewed from the point of view of the top side of FIG. 1, has a generally circular outline. What might be thought of as the foundation carrier in head 10 is a flexible web 12, also referred to herein as first magnetic means, formed of a suitable, high-permeability magnetic material which is also electrically conductive, such as 2826 MB Metglas ($Fe_{40}NI_{38}Mo_4B_{18}$) and 2605 SE Metglas ($Fe_{81}B_{13.5}Si_{3.5}C_2$) manufactured by Allied Chemical Company.

Provided in web 12 is a tapered annular aperture 14 which opens to both faces of the web. Formed within aperture 14, and distributed substantially symmetrically about the aperture on what is the upper surface of web 12, in FIG. 1 is a thin layer of a diamagnetic material, such as copper cyanide, nickel or tin. This diamagnetic material, for reasons which will become apparent in the following discussion, is also referred to as spacer means.

Formed within aperture 14, and distributed about the wall therein, on top of spacer 16, is a gold collar 18. Collar 18 also functions as a diamagnetic material as well as an electrical conductor. Spacer 16 and web 12 are also electrically conductive for conducting current when the head is energized, as described in my above-noted applications.

Electrically contacting and surrounding the upper end of collar 18 is a copper cup **20*a* which forms part of a current-carrying electrical conductor 20 in head 10. Also included in conductor 20 and formed integrally with cup 20*a* is a spiral coil 20*b* which is disposed substantially symmetrically about aperture 14 as particularly shown in FIG. 2. As can be seen, coil 20*b* is substantially planar, and lies in a plane spaced somewhat above the top surface of web 12, as shown in FIG. 1. Conductor 20 is also referred to as electrical current-carrying means and coil 20*b*** is also termed spiral coil means.

Coil **20*b* is embedded and supported in a layer 22** of a suitable dialectric material, such as Pyralin or Polyimid as described in my above-referenced prior application.

Completing a description of head 10, formed over the parts already described is a blanket 24 of a high-permeability but non-electrically conductive magnetic material which takes the form of a nickel-iron alloy, such as Permalloy. What is termed a second portion **24*b* of this blanket extends in a fairly uniform layer downwardly, in the central portion of the head, into cup 20*a* and into the inside of collar 18. Blanket portion 24*b* is disposed concentric with aperture 14 and is referred to as a second magnetic pole means. A bottom face or surface 24*c*,** also referred to as a second pole face and a first surface, respectfully, is flush with the lower face or surface of web 12. Blanket 24 is also distributed over all of the head, including a substantial portion beyond coil 20b with respect to aperture 14. In this extended area, web 12 and blanket 24 are only separated by spacer 16. Suitable clearance apertures are produced in blanket 24 to afford external electrical connection access to conductor 20.

Head 10 may be manufactured using conventional thin-film and integrated-circuit techniques. The vertical thicknesses of the various layers in FIG. 1 are approximately 60 microns for web 12, 1500 Angstroms or 0.15 microns for spacer 16, 16 microns for the coils and the surrounding insulator layer 22 and 18 microns for blanket 24. The thickness of the front gap, identified as dimension 'B' in FIG. 1, is approximately 18 microns wide. It can be seen from this that back gap thickness 'A' is approximately 1/100 of the thickness of the front gap.

When coil 20b is energized with current flowing into the coils on the left portion of FIG. 1 and out of the corresponding coils on the right side, flux is induced to flow along paths indicated by the solid arrows, such as arrow 26. The paths around coil 20b pass through web 12 as shown, through one portion of the web spaced from the aperture having an extended or flange-like structure 12a where it faces and contacts a portion 16a of spacer 16. Contacting the other side of spacer portion 16a is a first portion 24a of blanket 24 which also extends from aperture 14 in a flange-like structure. As shown by arrows 26, the flux travels in blanket 24 and in second portion 24b to first surface 24c which is flush with the lower surface of web 12 and forms what is termed a second pole face.

The flux then travels through the air gap or front writing gap 28 and around collar 18 to the edge of the lower web surface which forms a first pole face 12b.

Without spacer 16 disposed in head 10, the flux would tend to follow arrows 26 when the head is excited. However, by adding spacer 16 to form a back gap in the magnetic circuit, increased reluctance is produced in that magnetic path. Curved arrows 30 show alternate flux paths between the coil windings.

Electric current is equal to voltage divided by resistance. Analogously, magnetic flux is equal to the number of ampereturns divided by the magnetic reluctance of the circuit. Referring now to FIG. 2, an electrical circuit which is analogous to the magnetic circuit of the head of FIG. 1 is shown. The magnetomotive force of the four coil turns is represented by batteries 32, 34, 36 and 38. Resistances 40, 42, 44, 46 and 48 and resistances 52, 54, 56 and 58 represent, respectively, the reluctances of the flux paths of blanket 24 and web 12. Shunt resistors 60, 62 and 64 represent the shunt reluctances associated with head 10 which correspond with the flux paths represented by arrows 30 in FIG. 1. Resistor 66 on the right end of the circuit of FIG. 2 represents the reluctance associated with front gap 28. Correspondingly, resistor 68 on the left end of the circuit represents the reluctance of spacer 16.

The addition of spacer 16 adds resistor 68 to the circuit of FIG. 2. This causes the total reluctance associated with what would otherwise be the normal flux path through web 12 and blanket 24 to have values closer to shunt reluctances 60, 62 and 64. Thus, the flux passing through these shunt paths increases. The result is a decrease of flux passing through spacer reluctance 68 as compared to the amount of flux that would pass without it.

The outer shoulders of head 10, as represented by region 70 in FIG. 1, tend to be thinner than other portions of blanket 24. Thus, this region tends to saturate before other portions of the head. When it saturates, it essentially becomes a block to any further increase in flux. Thus, driving the coils harder does not necessarily produce a proportional increase in the amount of flux obtainable through a head. Since all heads are driven by a standard current, it is desirable to be able to compensate for physical discrepancies of the head in a uniform manner.

By adding spacer portion 16a, the shunt flux paths are utilized as a desired flux path. Since all of the flux produced by the coils passes through front gap 28 but does not pass through back gap 16a, shoulder 70 does not saturate. Thus, head 10 may be driven harder to increase the amount of flux induced in the head without blocking the flux path with a saturated region. This increase in driving current causes proportional increases in flux for each of the coil turns.

An additional novel feature of applicant's invention is the structure of the back gap as has been described with reference to FIG. 1. It can be seen that the flux travels through spacer portion 16a generally perpendicular to its faces as shown. Portion 16a extends away from aperture 14 substantially past what can be seen as the normal flux path associated with the back gap. As the head is driven harder, additional flux is caused to flow in the head, as has been discussed previously and as is shown by the dashed arrows 72. As the additional flux passes through the back gap, due to the substantially higher permeability of the associated web and blanket as compared to spacer 16, the flux lines spread out along the back gap, as shown. The magnetic reluctance of a portion of a magnetic circuit is defined as the effective length of the flux path divided by the material's permeability times the cross-sectional area perpendicular to the direction of flux flow. Since the area perpendicular to the flux flow along spacer portion 16a increases substantially with the distance from aperture 14, an increase in driving force of head 10 causes a proportionately larger area of spacer portion 16a to be penetrated by the flux. Thus, although the effective length of the flux path increases to some degree, the effective area associated with the flux path along spacer portion 16a increases substantially. The result is that with an increase in current driving the head, flux increases. However, with the flux increase there is an increase in the effective flux path area associated with spacer portion 16a, thereby reducing the effective reluctance of the path. The net effect is a proportionately larger increase in flux for a given increase in current driving the head. So, although having a back gap in head 10 requires that a larger current be used to drive head 10 sufficiently, there is an increased efficiency of the head with incremental increases of driving current.

While the invention has been particularly shown and described with reference to the foregoing preferred embodiment, it will be understood by those skilled in the art that other changes in form and detail may be made therein without departing from the spirit and scope of the invention as defined in the following claims.

It is claimed and desired to secure by Letters Patent:

1. Apparatus for producing a magnetic image in a magnetic-image storage medium comprising first magnetic pole means defining a generally thin-film sheet-like magnetic web including one web surface defining a pole face and having one portion spaced from said one surface, second magnetic pole means disposed on one side of said web including a first surface adjacent and magnetically spaced from said one surface defining a second pole face and including a first portion disposed adjacent said one portion, thin-film non-magnetic spacer means interposed said one portion of said first magnetic means and said first portion of said second magnetic means, and electrical current-carrying means distributed relative to said two magnetic means in a manner capable of inducing magnetic flux along a known flux path passing through the latter and through said spacer means.

2. The apparatus of claim 1, wherein said spacer means is of a generally uniform thickness, and said first and second magnetic means each define operatively a flux travel path having known cross-sectional areas normal to the flux flow along its length, said spacer means and said one and first portions of said first and second magnetic means, respectively, having cross-sectional areas normal to the flux flow larger than any cross-sectional area in either of the flux paths in other portions of said two magnetic means.

3. Apparatus for producing a magnetic image in a magnetic-image storage medium comprising first magnetic pole means defining a generally thin-film sheet-like magnetic web including an aperture opening to opposite surfaces of the web and having one portion spaced from said aperture, second magnetic pole means disposed on one side of said web including a first portion disposed adjacent said one portion and a second portion extending in a gapped, non-contacting manner through the aperture with a face which is substantially flush with the opposite side of said web, thin-film non-magnetic spacer means interposed said one portion of said first magnetic means and said first portion of said second magnetic means, and electrical current-carrying means distributed relative to said two magnetic means in a manner capable of inducing magnetic flux in the latter, which flux also travels through said spacer means.

4. The apparatus of claim 3, wherein said one and first portions of said respective magnetic means form flange-like structures contacting opposite sides of said spacer means, each of said flange-like structures and said spacer means being structured to have a cross-sectional area normal to said flux path which exceeds the largest effective cross-sectional area of the flux path otherwise existing in said two magnetic means.

5. Apparatus for producing a magnetic image in a magnetic-image storage medium comprising first magnetic means defining a generally thin-film sheet-like magnetic web including an aperture opening to opposite surfaces of the web with one web surface adjacent said aperture defining an annular first pole face, thin-film non-magnetic annular spacer means disposed on one side of said web opposite from the pole-face-defining surface generally symmetrically surrounding said aperture and having one portion spaced from said aperture, electric-current-carrying means including generally planar spiral coil means disposed on said one side of said web also generally symmetrically surrounding said aperture in such a manner that said spacer mean's one portion extends beyond said coil means relative to said aperture, and second magnetic means projecting, in a gapped, non-contacting manner relative to said first magnetic means, through said aperture and blanketing, on said one side of saib web, said coil means and said spacer means, said second magnetic means including a first surface disposed substantially flush with said one surface of said first magnetic means defining a pole face generally concentric with said first pole face.

6. The apparatus of claim 5, wherein said first and second magnetic means are of generally uniform known thicknesses and said spacer means extends beyond said coil means, in contact with said two magnetic means, a distance exceeding the thickness of the thicker of said two magnetic means.

* * * * *